US 8,572,109 B1

(12) United States Patent
Hodge et al.

(10) Patent No.: US 8,572,109 B1
(45) Date of Patent: Oct. 29, 2013

(54) QUERY TRANSLATION QUALITY CONFIDENCE

(75) Inventors: Vanessa Hodge, San Francisco, CA (US); Kevin Law, San Francisco, CA (US); Gaurav Garg, Palo Alto, CA (US); Radhika Malpani, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 195 days.

(21) Appl. No.: 12/481,421

(22) Filed: Jun. 9, 2009

Related U.S. Application Data

(60) Provisional application No. 61/178,784, filed on May 15, 2009.

(51) Int. Cl.
*G06F 17/30* (2006.01)

(52) U.S. Cl.
USPC ............ 707/760; 707/706; 707/713; 707/735; 707/758; 706/12; 706/15; 706/45; 715/200

(58) Field of Classification Search
None
See application file for complete search history.

(56) References Cited

U.S. PATENT DOCUMENTS

| | | | |
|---|---|---|---|
| 5,893,095 A | 4/1999 | Jain et al. | |
| 5,911,139 A | 6/1999 | Jain et al. | |
| 5,913,205 A | 6/1999 | Jain et al. | |
| 6,006,221 A * | 12/1999 | Liddy et al. | ............................ 1/1 |
| 6,078,916 A | 6/2000 | Culliss | |
| 6,381,598 B1 | 4/2002 | Williamowski et al. | |
| 6,526,400 B1 | 2/2003 | Takata et al. | |
| 6,594,654 B1 * | 7/2003 | Salam et al. | ............................ 1/1 |
| 6,604,101 B1 | 8/2003 | Chan et al. | |
| 6,640,218 B1 | 10/2003 | Golding et al. | |
| 6,701,309 B1 | 3/2004 | Beeferman et al. | |
| 6,757,646 B2 | 6/2004 | Marchisio | |
| 6,983,270 B2 | 1/2006 | Rippich | |
| 7,047,182 B2 | 5/2006 | Masuichi | |
| 7,130,849 B2 | 10/2006 | Yayoi et al. | |
| 7,146,358 B1 | 12/2006 | Gravano et al. | |
| 7,165,080 B2 | 1/2007 | Kotcheff et al. | |
| 7,260,570 B2 | 8/2007 | Brown et al. | |
| 7,421,097 B2 | 9/2008 | Hamza et al. | |
| 7,668,823 B2 | 2/2010 | Oldham et al. | |
| 7,672,831 B2 | 3/2010 | Todhunter et al. | |

(Continued)

OTHER PUBLICATIONS

Wei Gao et al, "Cross-Lingual Query Suggestion Using Query Logs of Different Languages", The Chinese University of Hong Kong, ACM, 2007.*

(Continued)

*Primary Examiner* — Hung Le
(74) *Attorney, Agent, or Firm* — Fish & Richardson P.C.

(57) ABSTRACT

Methods, systems, and apparatus, including computer program products, for generating visual media search results are provided. A first search query in a first language and a second search query in a different second language are received. The first search query is a translation of the second search query into the second language. A quality of results statistic for the second search query is obtained. A final search query is created using the first search query, the second search query, and the quality of results statistic. The final search query is sent to a search engine and a final group of visual media search results responsive to the final search query are received from the search engine, where visual media search results in the final group that are responsive to the second visual media search query are assigned a ranking based in part on the quality of result statistic.

18 Claims, 7 Drawing Sheets

(56) References Cited

U.S. PATENT DOCUMENTS

| | | | |
|---|---|---|---|
| 7,698,331 B2 | 4/2010 | Carson et al. | |
| 7,720,856 B2* | 5/2010 | Goedecke et al. | 707/759 |
| 7,752,032 B2 | 7/2010 | Izuha | |
| 7,773,800 B2 | 8/2010 | Liu | |
| 7,783,633 B2* | 8/2010 | Florian et al. | 707/729 |
| 7,813,917 B2 | 10/2010 | Shuster | |
| 7,818,314 B2 | 10/2010 | Chowdhury et al. | |
| 7,917,488 B2 | 3/2011 | Niu et al. | |
| 7,991,608 B2 | 8/2011 | Johnson et al. | |
| 8,024,337 B1 | 9/2011 | Baluja et al. | |
| 8,051,061 B2* | 11/2011 | Niu et al. | 707/706 |
| 8,065,296 B1 | 11/2011 | Franz et al. | |
| 8,171,041 B2* | 5/2012 | Bennett | 707/760 |
| 8,209,330 B1 | 6/2012 | Covell et al. | |
| 8,244,720 B2 | 8/2012 | Bihun et al. | |
| 8,364,462 B2 | 1/2013 | Joy et al. | |
| 8,457,416 B2 | 6/2013 | Liu et al. | |
| 2001/0021934 A1 | 9/2001 | Yokoi | |
| 2001/0029455 A1* | 10/2001 | Chin et al. | 704/277 |
| 2002/0097914 A1 | 7/2002 | Yaung | |
| 2002/0123982 A1 | 9/2002 | Masuichi | |
| 2002/0156763 A1 | 10/2002 | Marchisio | |
| 2002/0164075 A1 | 11/2002 | Acharya et al. | |
| 2002/0184206 A1 | 12/2002 | Evans | |
| 2003/0035595 A1 | 2/2003 | Liu | |
| 2003/0050923 A1 | 3/2003 | Chang et al. | |
| 2003/0149686 A1 | 8/2003 | Drissi et al. | |
| 2003/0200079 A1 | 10/2003 | Sakai | |
| 2004/0006560 A1 | 1/2004 | Chan et al. | |
| 2004/0261021 A1 | 12/2004 | Mittal et al. | |
| 2005/0060311 A1 | 3/2005 | Tong et al. | |
| 2005/0234898 A1 | 10/2005 | Drissi et al. | |
| 2005/0267734 A1 | 12/2005 | Masuyama | |
| 2006/0129915 A1 | 6/2006 | Chan | |
| 2006/0173839 A1 | 8/2006 | Knepper et al. | |
| 2006/0173886 A1 | 8/2006 | Moulinier et al. | |
| 2006/0217954 A1 | 9/2006 | Koyama et al. | |
| 2006/0230022 A1 | 10/2006 | Bailey et al. | |
| 2006/0230035 A1 | 10/2006 | Bailey et al. | |
| 2006/0241934 A1 | 10/2006 | Izuha | |
| 2006/0271350 A1 | 11/2006 | Chino et al. | |
| 2007/0106653 A1 | 5/2007 | Sun | |
| 2007/0250494 A1* | 10/2007 | Peoples et al. | 707/4 |
| 2007/0276820 A1 | 11/2007 | Iqbal | |
| 2008/0015843 A1 | 1/2008 | Barghout | |
| 2008/0104045 A1 | 5/2008 | Cohen et al. | |
| 2008/0183685 A1 | 7/2008 | He et al. | |
| 2008/0189257 A1* | 8/2008 | Wiseman et al. | 707/4 |
| 2008/0288474 A1* | 11/2008 | Chin et al. | 707/4 |
| 2008/0300854 A1 | 12/2008 | Eibye | |
| 2008/0306729 A1 | 12/2008 | Drissi et al. | |
| 2008/0306923 A1 | 12/2008 | Drissi et al. | |
| 2009/0024613 A1* | 1/2009 | Niu et al. | 707/5 |
| 2009/0063455 A1 | 3/2009 | Li et al. | |
| 2009/0070318 A1 | 3/2009 | Song et al. | |
| 2009/0074306 A1 | 3/2009 | Liu et al. | |
| 2009/0076800 A1 | 3/2009 | Li et al. | |
| 2009/0083243 A1* | 3/2009 | Heymans et al. | 707/4 |
| 2009/0089332 A1 | 4/2009 | Harger et al. | |
| 2009/0125497 A1* | 5/2009 | Jiang et al. | 707/4 |
| 2009/0132233 A1 | 5/2009 | Etzioni et al. | |
| 2009/0182547 A1 | 7/2009 | Niu et al. | |
| 2009/0222437 A1* | 9/2009 | Niu et al. | 707/5 |
| 2009/0326914 A1 | 12/2009 | Joy et al. | |
| 2010/0070662 A1 | 3/2010 | Odenwald et al. | |
| 2010/0161642 A1* | 6/2010 | Chen et al. | 707/759 |
| 2010/0198837 A1 | 8/2010 | Wu et al. | |
| 2011/0055189 A1 | 3/2011 | Effrat et al. | |

OTHER PUBLICATIONS

Rong Hu et al, "Mining Translation of Web Queries from Web Clickthrough Data", Department of Computer Science, Huazhong University of Science and Technology, China, 2008.*

Ambati et al, "Using Monolingual Clickthrough Data to Build Crosslingual Search System", ACM, 2006.*

Clough et al, "The CLEF 2005 Cross-Language Image Retrieval Track", Sheffield University, UK, 2005.*

Clough et al, "User Experiments With the Eurovision Cross-Language Image Retrieval System", Sheffield University, 2006.*

Gao et al, "Cross-Lingual Query Suggestion Using Query Longs of Different Languages", ACM, 2007.*

Gareth Jones, "New Challenges for Cross-Language Information Retrieval: multimedia data and user experience", Cross-Language Evaluation Forum Workshop, Portugal, 2000.*

Sanderson et al, "Measuring a cross language image retrieval system", Sheffield University, UK, 2004.*

Aljlayl, Mohammed et al., "On Arabic-English Cross-Language Information Retrieval: *A Machine Translation Approach*", Information Retrieval Laboratory [online] Illinois Institute of Technology [retrieved on Jun. 2, 2009]. Retrieved from: http://www.ir.iit.edu/publications/downloads/073_aljlayl_m.pdf.

Etzioni, Oren et al. "Lexical Translation with Application to Image Search on the Web", Turing Center [online], Dept. of Computer Science and Engineering, University of Washington [retrieved on Jun. 2, 2009]. Retrieved from: http://turing.cs.washington.edu/papers/EtzioniMTSummit07.pdf.

Google Search Appliance 6.0, "Access all of your business content through one search box". Datasheet [online], [retrieved on Jun. 2, 2009]. Retrieved from: http://www.google.com/url?sa=t&source=web&ct=res&cd=1&url=http%3A%2F%2Fwww.google.com%2Fenterprise%2Fpdf%2Fgsa_datasheet.pdf&ei=vH33SbriKKPFtgfA_eCiDw&usg=AFQjCNEskaQmDwohxU9IIdeQ6DfkzdL1w.

Translated Search—Google Translate, [online], [retrieved on Jun. 2, 2009]. Retrieved from: http://translate.google.com/translate_s?hl=en.

History of Yandex, [online], [retrieved on Jun. 2, 2009]. Retrieved from: http://company.yandex.com/general_info/history.xml.

Example of image search, Yandex close up, ЯНДЕКС [online], [retrieved on May 5, 2009] Retrieved from: http://images.yandex.ru.

Example of image search, Yandex search results, ЯНДЕКС [online], [retrieved on May 5, 2009] Retrieved from: http://images.yandex.ru.

PanImages Image Search Tool Speaks Hundreds of Languages~Tech News Watch, Lockergnome, Sep. 12, 2007, [online], [retrieved on Jun. 2, 2009]. Retrieved from: http://www.lockergnome.com/news/2007/09/12/panimages-image-search-tool-speaks-hundreds-of-languages/.

Cross Language Information Retrieval, Moustafa A. Youssef, Apr. 2001 [online] Department of Computer Science, University of Maryland [retrieved on Jun. 2, 2009]. Retrieved from: http://www.otal.umd.edu/UUPractice/clir/.

Access all of your business content through one search box. Datasheet [online]. Google Search Appliance 6.0 [retrieved on Jun. 2, 2009]. Retrieved from: 2Fgsa_datasheet.pdf&ei=vH33SbriKKPFtgfA_eCiDw&usg=AFQjCNE_skaQmDwohxU9IIdeQ6Dfkzd1w.

Google translate, 'Translated Search' [online], [retrieved on Jun. 2, 2009]. Retrieved from: http://translate.google.com/translate_s?hl=en.

Example of image search, Yandex close up, ЯНДЕКС [online], [retrieved on May 5, 2009] Retrieved from: http://images.yandex.ru.

Youssef, Moustafa A., 'Cross Language Information Retrieval', Apr. 2001 [online] Department of Computer Science, University of Maryland [retrieved on Jun. 2, 2009]. Retrieved from: http://www.otal.umd.edu/UUPractice/clir/.

Kimura, et al., "Cross-Language Information Retrieval Based on Category Matching Between Language Versions of a Web Directory", Japan, 2003.

Maeda, et al., "Query Term Disambiguation for Web Cross-Language Information Retrieval using a Search Engine", ACM, 2000.

Chen, "Multilingual Information Retrieval Using English and Chinese Queries", University of California at Berkeley, 2002.

(56) References Cited

OTHER PUBLICATIONS

Chen, et al, "Multilingual Information Retrieval Using Machine Translation, Relevance Feedback and Decompounding", Kluwer Academic Publishers, Netherlands, 2004.
Oard, Douglas W., "Interactive Cross-Language Information Retrieval", 2001.
Gey, et al, "Cross Language Information Retrieval: A Research Roadmap", SIGIR, 2002.
Gey, et al, "New Directions in Multilingual Information Access", SIGIR, 2006.
He, et al, "Studying the Use of Interactive Multilingual Information Retrieval", ACM, 2006.
Kumaran, et al, "On Pushing Multilingual Query Operators into Relational Engines", Database Systems Laboratory, India, 2006.
Lu, et al, "Analysis of the Bilingual Queries of a Chinese Web Search Engine", Hong Kong, 2006.
Parton, et al, "Simultaneous Multilingual Search for Translingual Information Retrieval", ACM, 2008.
Office Action issued in U.S. Appl. No. 12/481,448 on Apr. 25, 2012, 13 pages.
Office Action issued in U.S. Appl. No. 12/481,454 on Apr. 26, 2012, 16 pages.
Office Action issued in U.S. Appl. No. 12/481,448 on May 24, 2011, 14 pages.
Office Action issued in U.S. Appl. No. 12/481,454 on Jun. 8, 2011, 27 pages.
Office Action issued in U.S. Appl. No. 12/477,577 on Sep. 1, 2011, 17 pages.
Notice of Allowance Action issued in U.S. Appl. No. 12/481,448 on Jan. 3, 2012, 11 pages.
Notice of Allowance issued in U.S. Appl. No. 12/481,454 on Jan. 25, 2012, 9 pages.
Notice of Allowance issued in U.S. Appl. No. 12/481,448 on Feb. 15, 2012, 10 pages.
Office Action issued in U.S. Appl. No. 12/477,577 on Mar. 13, 2012, 15 pages.
Notice of Allowance issued in U.S. Appl. No. 12/481,454 on Mar. 21, 2012, 11 pages.
Office Action issued in U.S. Appl. No. 12/481,454 on Oct. 29, 2012, 16 pages.
Office Action issued in U.S. Appl. No. 12/481,448 on Oct. 29, 2012, 17 pages.
Office Action issued in U.S. Appl. No. 12/477,577 on Mar. 7, 2013, 22 pages.
Notice of Allowance issued in U.S. Appl. No. 12/481,448 on May 3, 2013, 12 pages.
Notice of Allowance issued in U.S. Appl. No. 12/481,454 on Jun. 14, 2013, 13 pages.
Notice of Allowance issued in U.S. Appl. No. 12/477,577 on Jun. 24, 2013, 33 pages.

* cited by examiner

QUERY TRANSLATION QUALITY CONFIDENCE

This application claims priority to U.S. Provisional Application Ser. No. 61/178,784, filed May 15, 2009, the entire disclosure of which is incorporated herein by reference.

BACKGROUND

This invention relates to combining search results responsive to a visual media search query and a translation of the query.

FIG. 1A illustrates a conventional approach—an example user interface for a search engine where a user has entered a visual media search query in one language (Greek) and the search engine has generated associated results in that language. In general, a search engine is a program that receives a search query from a user and returns one or more search results that satisfy the search query. In general, a visual media search is a word-based search for visual media. The visual media search query is the word or words on which the search is based. Visual media can be, for example, images, video, images embedded in files, video embedded in files, and interactive media such as javascript or actionscript games.

In FIG. 1A, the visual media search query is "σκιέρ" 102. σκιέρ is the Greek word for skier. In response to receipt of the visual media search query, a search is performed, one matching result 104 is identified, and this one matching result 104 is presented to the user through the user interface.

SUMMARY

In general, one aspect of the subject matter described in this specification can be embodied in methods that include the following. A first visual media search query and a second visual media search query are received. The first visual media search query is in a first language and the second visual media search query is in a different second language. The first visual media search query is a translation of the second visual media search query into the second language. A quality of results statistic for the second visual media search query is obtained. A final visual media search query is created using the first visual media search query, the second visual media search query, and the quality of results statistic. The final visual media search query is sent to a search engine and a final group of one or more visual media search results responsive to the final visual media search query are received from the search engine. The visual media search results in the final group that are responsive to the second visual media search query are assigned a ranking based in part on the quality of results statistic. Other implementations of this invention include corresponding systems, apparatus, computer program products, and computer readable media.

These and other implementations can optionally include one or more of the following features. The quality of results statistic can be a click through rate for queries similar to the second query. The quality of results statistic can be a click through rate for the second query. The quality of results statistic can reflect a dwell time associated with search results selected by users after submitting a query identical to the second visual media search query.

Creating a final visual media search query using the first visual media search query and the second visual media search query can further comprise associating the second visual media search query with one of a plurality of confidence bins based on the quality of results statistic. The visual media search results in the final group of search results that are responsive to the second visual media search query can be assigned a ranking based in part on the confidence bin.

The final group of visual media search results can be presented.

Visual media can be an image, a video, an image embedded in a file, or a video embedded in a file.

Particular embodiments of the subject matter described in this specification can be implemented to realize one or more of the following advantages. A higher quality of visual media search results can be presented to a user. A broader group of visual media search results can be presented to the user. A group of visual media search results that are more responsive to the user's intended search can be presented to the user. Search results relevant to a local concept can be returned even if the user searches in a language different from the local language.

The details of one or more implementations of the invention are set forth in the accompanying drawings and the description below. Other features, objects, and advantages of the invention will be apparent from the description and drawings, and from the claims.

DETAILED DESCRIPTION

Figure 1A:
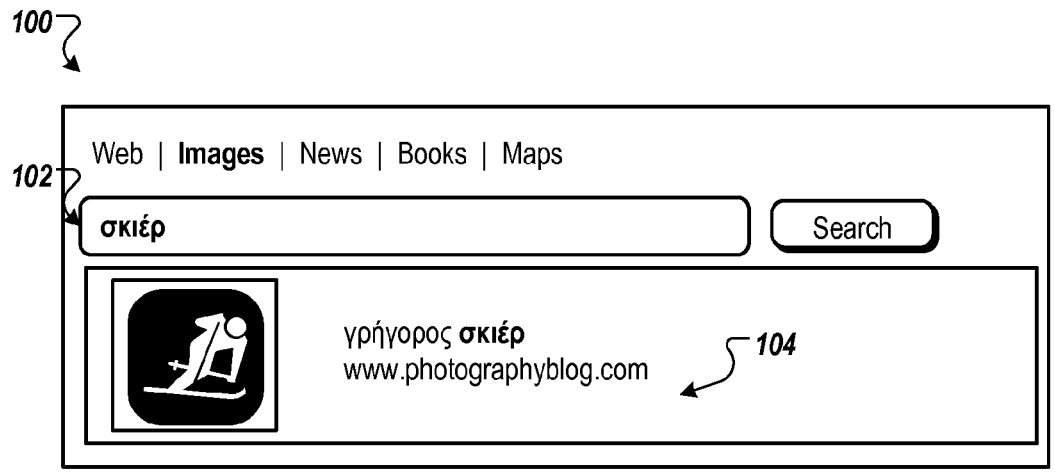
FIG. 1A illustrates an example of a conventional approach featuring an image search query in one language and associated results in that language.

The small group of search results shown in FIG. 1A can be disappointing to a user. There are many reasons a group of search results can be small, including an unusual topic or a misspelled search query. However, in many cases, the group of search results is small because of the language the user is searching in. Some concepts are more popular in certain languages. For example when discussing the Golden Gate Bridge in San Francisco, Calif., people are more likely to use English than Dutch, because the Golden Gate Bridge is a United States' landmark, and the English phrase is how the bridge is named in the United States. If a user has entered a search query in a natural language where the search query is not a popular concept, few results may be returned. This is true even though the search query concept may be very popular in other natural languages and, if the user entered a visual media search query in one of those other languages, he or she would be presented with a larger number of search results.

Figure 1B:
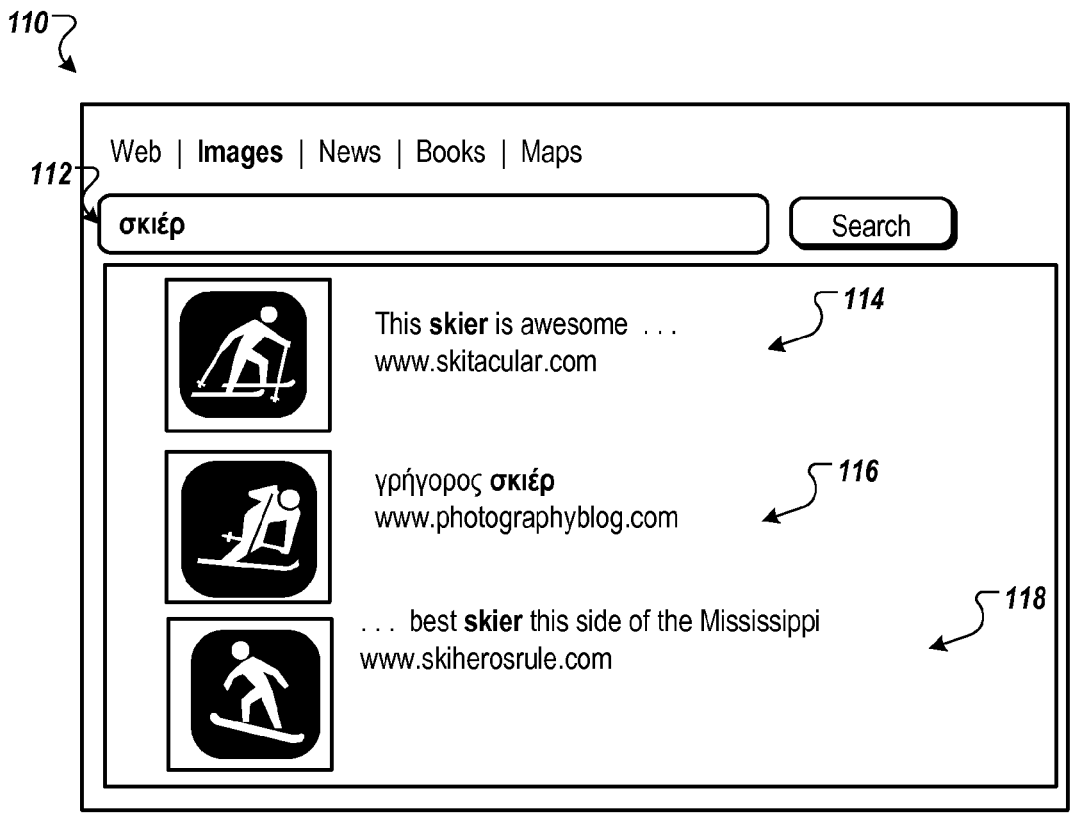
FIG. 1B illustrates an example image search query in one language and associated results in that language and a second language.

FIG. 1B illustrates an example user interface for a search engine where a user has entered a visual media search query in one natural language (Greek) and the search engine has generated associated results in two natural languages (Greek and English). The results correspond to the Greek query σκιέρ and its translation into English ("skier"), and the results are ranked based in part on a quality of results statistic for the translation. In general, a quality of results statistic measures the frequency with which users select a search result after submitting a query similar to the translated query. Here, the quality of results statistic for "skier" is high, and thus an English result responsive to "skier" 114 is ranked ahead of the Greek result responsive to "σκιέρ" 116.

In some implementations, two queries must be identical to be considered similar. In alternative implementations, the queries do not have to be identical to be considered similar. For example, the query in the search history and the query 202 can be sufficiently similar when they have the same meaning, despite small differences in spelling, small differences in word order, the use of abbreviations, the use of synonyms, or the use of stop words (e.g., known terms that do not contribute to the topicality of the query such as "a" or "the"). Other common measures of similarity can also be used, for example, using the edit distance for the two queries.

In some implementations, the quality of results statistic for a translated query is the click through rate of the translated query. The click through rate is calculated by taking the number of times users selected a search result after submitting a query similar to the translated query and dividing that by the total number of times the query was submitted by the population of users. Other quality of results statistics are possible, for example, the total number of times a user selected a search result. The quality of results statistic can also further reflect the dwell time associated with one or more of the search results corresponding to the query in the search history. Dwell time is the amount of time a user spends viewing a search result. Dwell time can be a continuous number, such as the number of seconds a user spends viewing a search result, or it can be a discrete interval, for example "short clicks" corresponding to clicks of less than thirty seconds, "medium clicks" corresponding to clicks of more than thirty seconds but less than one minute, and "long clicks" corresponding to clicks of more than one minute. In some implementations, a longer dwell time of one or more results is associated with a higher quality of results statistic. The quality of results statistic is higher because users found the results with a longer dwell time useful enough to view for a longer period of time. In FIG. 1B, the user has entered the visual media search query "σκιέρ" 112, meaning skier in Greek. A search is performed using both the Greek "σκιέρ" and the English "skier." The results of this search 114-118 are assigned a ranking based on the quality of results statistic for the query "skier." The result is a more robust group of search results. The result from FIG. 1A 116 is again presented, but it is proceeded by an additional result in English 114 and followed by an additional result in English 118.

Augmenting a visual media search query with its translation into a different relevant language can thus increase the number of search results returned to a user. Two languages can be different when they are distinct languages, for example, English and French, or when they are different dialects of the same language. Using a quality of results statistic that estimates the relevance of a translated query helps ensure that the additional search results will be useful to the user. Because visual media typically involves image and video content which conveys information independent of language, the user is likely less concerned with the language of the search result and more concerned with the content of the visual media. Therefore, visual media search queries are an especially fruitful area for query translation. However, similar techniques could be used in any other type of search, for example, documents searches.

Visual media is not limited to images. For example, visual media can include video, images embedded in an electronic file, video embedded in an electronic file, and interactive media such as javascript or actionscript games. Visual media does not necessarily correspond to an electronic file. Visual media can be stored in a portion of a file that holds other documents, in a single file dedicated to the visual media in question, or in multiple coordinated files. Moreover, visual media can be stored in memory without first having been stored in a file.

The search query does not have to be received from a user; instead, it can be received from any source, including, for example, a computer or a process on a computer. The search query does not have to be received through a search engine user interface, but can be received through any interface where a user or a process is able to send a search query. The translation does not have to be received from a user; instead, it can be received from any source, including, for example, a computer or a process on a computer.

Presenting search results is not limited to causing visual media to be presented to the user. Presenting search results can include, for example, displaying search results on a display device, transmitting search results to a user's computer for presentation to the user, transmitting search results to another device, transmitting sounds corresponding to the search results, providing haptic feedback corresponding to the search results, or transmitting signals comprising haptic feedback corresponding to the search results to a user's computer for presentation to the user. Other methods of presenting search results are possible.

Figure 2:
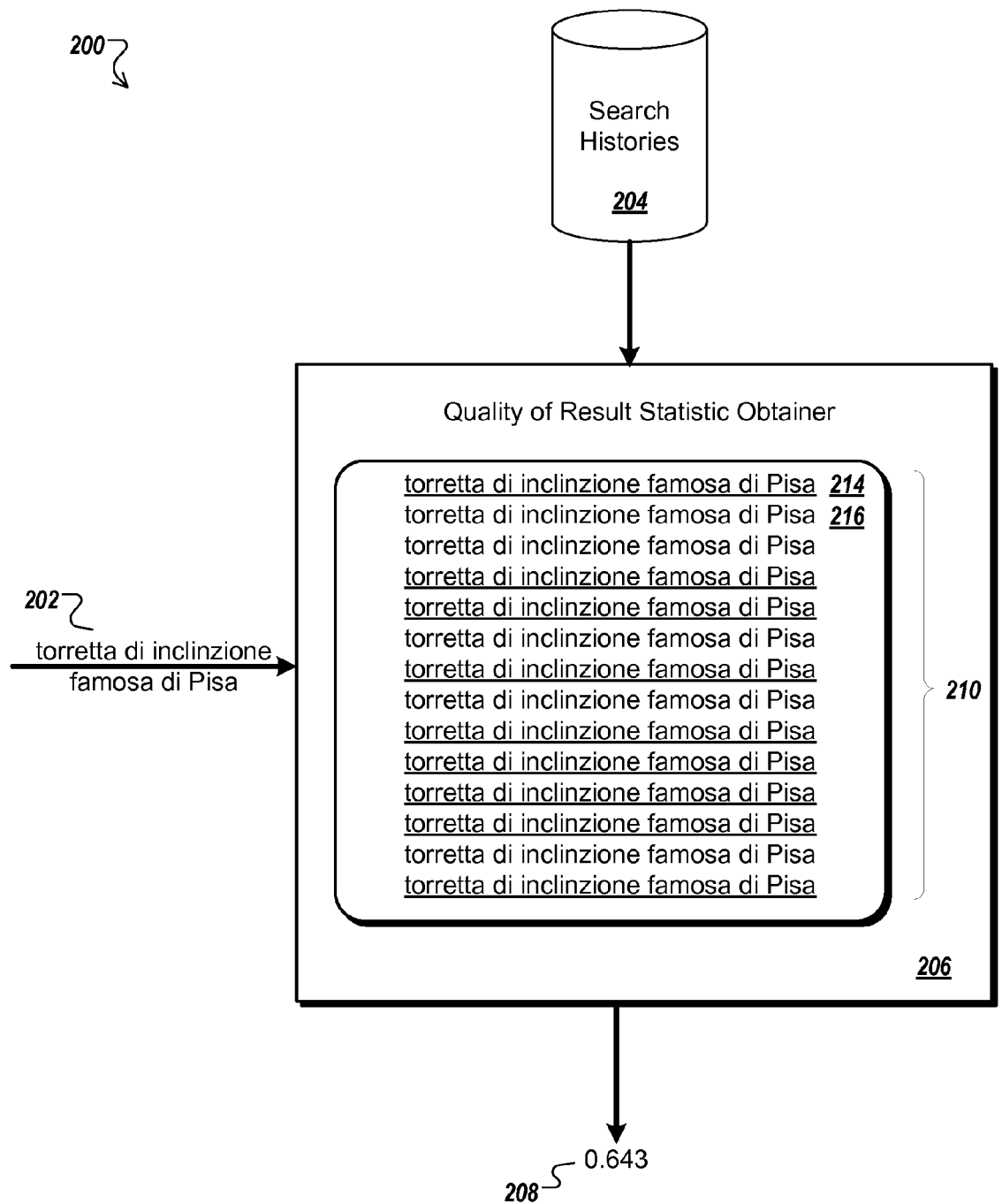
FIG. 2 illustrates an example of determining a quality of results statistic corresponding to a query and a set of search histories.

FIG. 2 illustrates an example of determining a quality of results statistic corresponding to a query and a set of search histories.

In FIG. 2, a query 202 and a set of search histories 204 are provided to a quality of results statistic obtainer 206. The quality of results statistic obtainer 206 uses the query 202 and the set of search histories 204 to determine a quality of results statistic 208 corresponding to the query 202.

In various implementations, the search query 202 is a visual media search query. However, the search query 202 can be any type of search query.

In various implementations, the set of search histories 204 contains one or more user search histories. A user search history stores a sequence of search queries submitted by a user or a computer or a process. A user search history can also store information regarding how many or which results responsive to a search query were selected by a user and how long each selected search result was viewed. The search queries in the search history can be visual media search queries or any other type of search query, for example a document search query. Multiple types of search queries can be included in the search history. User search histories may also store additional information, such as the IP address of the user. User search histories can be created based on information sent from a user's computer to a search engine. User search histories are a convenient way to store user search history information. However, other formats for organizing and storing the user search history information captured by a user search history can also be used.

In various implementations, when the quality of results statistic obtainer 206 receives the query 202 and the search histories 204, it identifies entries 210 from the search histories 204 corresponding to queries that are sufficiently similar to the query 202. In some implementations, the query in the search history must be identical to the query 202. In alternative implementations, the query in the search history does not have to be identical to the query 202. For example, the query in the search history and the query 202 can be sufficiently similar when they have the same meaning, despite small differences in spelling, small differences in word order, the use of abbreviations, the use of equivalent slang words, or different inclusion of articles such as "a" or "the."

Some of the entries from the search histories correspond to situations where a user selected a search result after submitting a query sufficiently similar to the query 202. These entries are underlined in FIG. 2, for example, 214. Some of the entries from the search histories correspond to situations where a user did not select any search results after submitting a query sufficiently similar to the query 202. These entries are not underlined in FIG. 2, for example, 216.

In some implementations the quality of results statistic is a value from 0 to 1 that corresponds to the click through rate of the query. The click through rate is the number of times users selected a search result after submitting a query sufficiently similar to the translated query, divided by the total number of times the query was submitted by the population of users. For example, in FIG. 2, the query "toretta di inclinzione famosa di Pisa" was submitted fourteen times in the set of user search histories 204. Nine of those times, a user selected a result after submitting the query. Thus, the click through rate is determined by dividing 9 by 14, resulting in a click through rate of approximately 0.643.

The quality of results statistic can be calculated in other ways, for example, by aggregating the total number of results selected by users after submitting a query, or considering the dwell time for each selected result.

In some implementations, the quality of results statistic is further refined by, for example considering the popularity of the query, where the popularity of the query is the percentage of queries in the search histories that are sufficiently similar to the query. A query with a high popularity can be assigned a higher quality of results statistic for various reasons. For example, a high popularity indicates that the query is commonly used, and thus likely a common way of describing a concept in the language of the query. In some implementations, the quality of results statistic is further refined by considering an overall estimate of the quality of search results for the translated query based on the content of each result responsive to a given query and its surrounding text.

In some implementations, the quality of results statistic for a given query is calculated as needed. In some implementations, the quality of results statistic for a given query is calculated in advance and stored, for example, in a database that associates a given query with its quality of results statistic. In some implementations, when a quality of results statistic is calculated as needed, it is then stored for later use, for example, in a database that associates a given query with its quality of results statistic.

Figure 3:
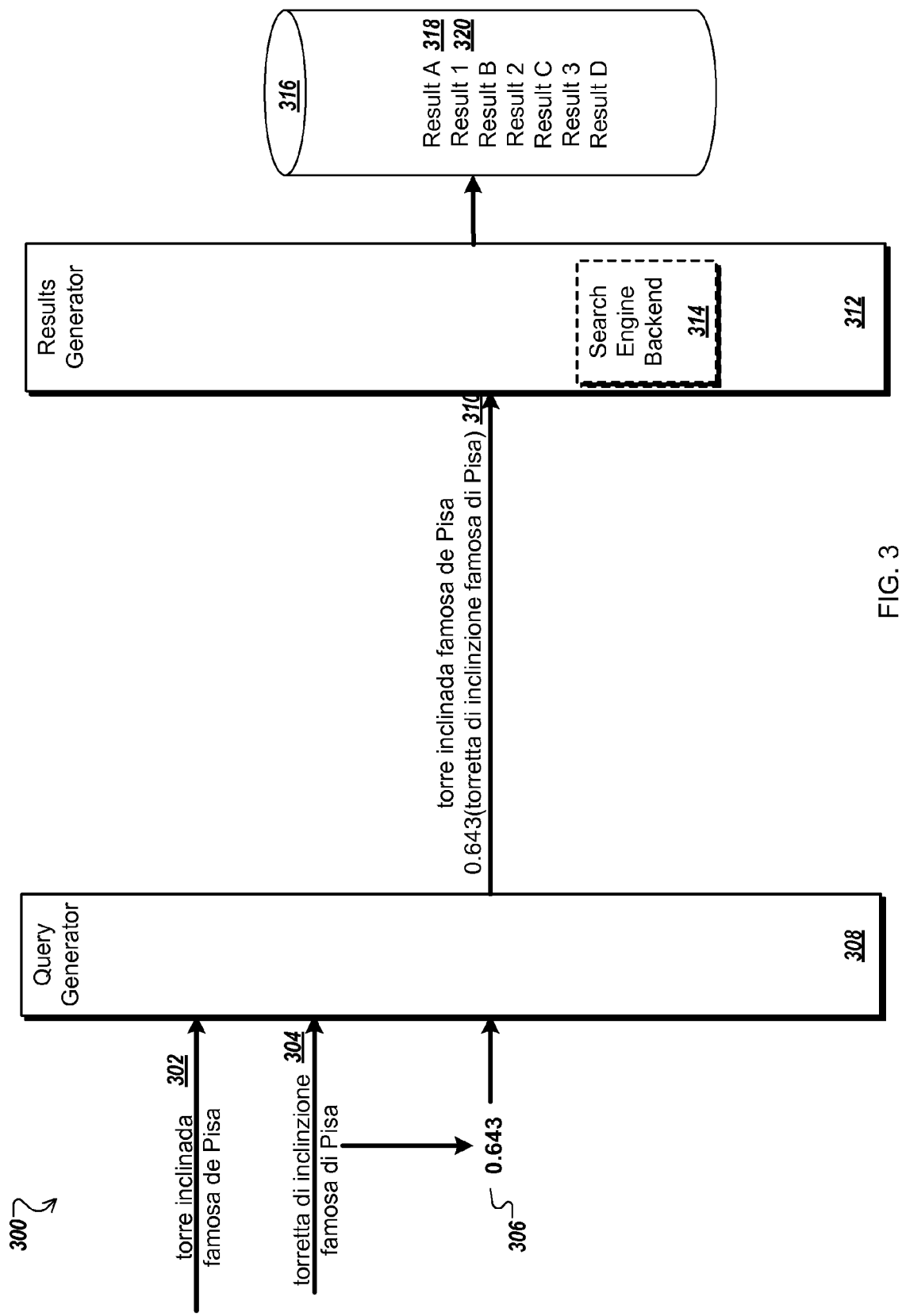
FIG. 3 illustrates an example of combining a query and its translation into a final query using a quality of results statistic for the translation and generating a group of search results responsive to the final query.

FIG. 3 illustrates an example of combining a query and its translation into a final query, using a quality of results statistic for the translation, and generating a group of search results responsive to the final query.

In FIG. 3, a search query 302, its translation 304 into another language, here, Italian, and a quality of results statistic for the translation 306 are provided to a query generator 308.

The translation 304 can be from a number of sources. In some implementations, the translation 304 is received from the user submitting the query. In some implementations, the translation 304 is received from a person other than the user submitting the query. In some implementations the translation 304 is received from a process or a computer. In some implementations, the translation 304 is received from a translation dictionary. In some implementations, the translation 304 is determined using the techniques described in U.S. patent application Ser. No. 12/481,448, for "Query Translation Using Bilingual Search Refinements," incorporated by reference. In some implementations, the translation is into a language determined by the process described in U.S. patent application Ser. No. 12/481,454, for "Selecting Relevant Languages for Query Translation," incorporated by reference.

In various implementations, the quality of results statistic 306 is the click through rate of the translated query 304. In some implementations the quality of results statistic is calculated using the method described above in regard to FIG. 2. In some implementations, the quality of results statistic has already been determined and is obtained from, for example, a database associating a given query with its quality of results statistic.

In various implementations, the query generator 308 combines the query 302 and its translation 304 into a final query 310 that specifies a search for both queries taking into account the quality of results statistic for the translated query 306. For example, the query can assign a score to each result of the query, where the score is the score of the result under the translated query multiplied by the quality of results statistic plus the score of the document under the original query. The final query is then passed to a results generator 312 that generates the group of search results 314.

In various implementations, the quality of results statistic 306 of the translated query 304 is used directly in the final query 310. In some implementations, the quality of results statistic 306 of the translated query 304 is used by the query generator 308 to determine additional information corresponding to the quality of result statistic of the translated query 304. In these implementations, the additional information is used by the query generator 308 instead of or in addition to the actual quality of results statistic 306. In some implementations, the additional information is the output of a function that takes the quality of results statistic as an input and returns a confidence value. In some implementations, the function is continuous. In some implementations, the function is discrete. In some implementations, the additional information is a confidence bin. For example, four bins can be identified, one corresponding to quality of results statistics between 0 and 0.25 ("very low confidence"), one corresponding to quality of results statistics between 0.25 and 0.5 ("low confidence"), one corresponding to quality of results statistics between 0.5 and 0.75 ("medium confidence"), and one corresponding to quality of results statistics between 0.75 and 1 ("high confidence"). The quality of results statistic 306 of the translated query 304 is scaled from 0 to 1, by, for example, dividing by the highest possible quality of result statistic. The scaled quality of results statistic is then associated with its corresponding bin. The bin information is then used by the query generator 308. Alternative ways of using confidence bins are possible. For example, any number of confidence bins can be used. The bins can be based on any range of scores, not just scores from 0 to 1. Alternative techniques of scaling the quality of results statistic 306 of the translation 304 are possible, for example, using a logarithmic scale. The quality of results statistic 306 of the translated query 304 does not have to be scaled. Alternative types of information corresponding to the quality of results statistic 306 of the translated query 304 are possible.

In various implementations, the results generator 312 applies the final search query 310 to one or more corpora of documents, resulting in a group of search results 316. The group of search results may include search results in the language of the visual media search query, e.g. Result A 318, and may also include search results in the language of the translation, e.g. Result 1 320. For example, in FIG. 3, Results A, B, C, and D correspond to results with Portuguese phrases (responsive to "tone inclinada famosa de Pisa" 302) and Results 1, 2, and 3 correspond to results with Italian phrases (responsive to "toretta di inclinzione famosa di Pisa" 304). Results can include phrases in more than one language. In some implementations, a result with a phrase satisfying the search query or its translation is included in the group of search results even if the rest of the document is in a different language. The search results can be generated from the final query 310 in a number of ways.

In some implementations, the results generator runs a search corresponding to the final query 310, using a search engine backend 314. The search engine backend 314 identifies a group of search results. Some of the identified search results satisfy the part of the final query 310 corresponding to the original query 302. Some of the identified search results satisfy the part of the final query 310 corresponding to the translation 304. Some of the identified search results satisfy both parts of the final query. Each search result has a score that measures its relevance to the query. In some implementations, the results generator or the search engine backend adjusts the scores based in part on the quality of results statistic 306. The quality of results statistic 306 of the translated query 304 can be used to adjust the scores, for example, by increasing or decreasing certain scores, to reflect the quality of results statistic 306 of the translated query 304. For example, in some implementations if the quality of results statistic for the translation is low, the scores of the search results corresponding to the translation are reduced. The results generator or the search engine backend ranks the search results based on their scores.

Other methods of generating a group of results responsive to a query and its translation taking into account a quality of results statistic for the translated query are possible.

Figure 4:
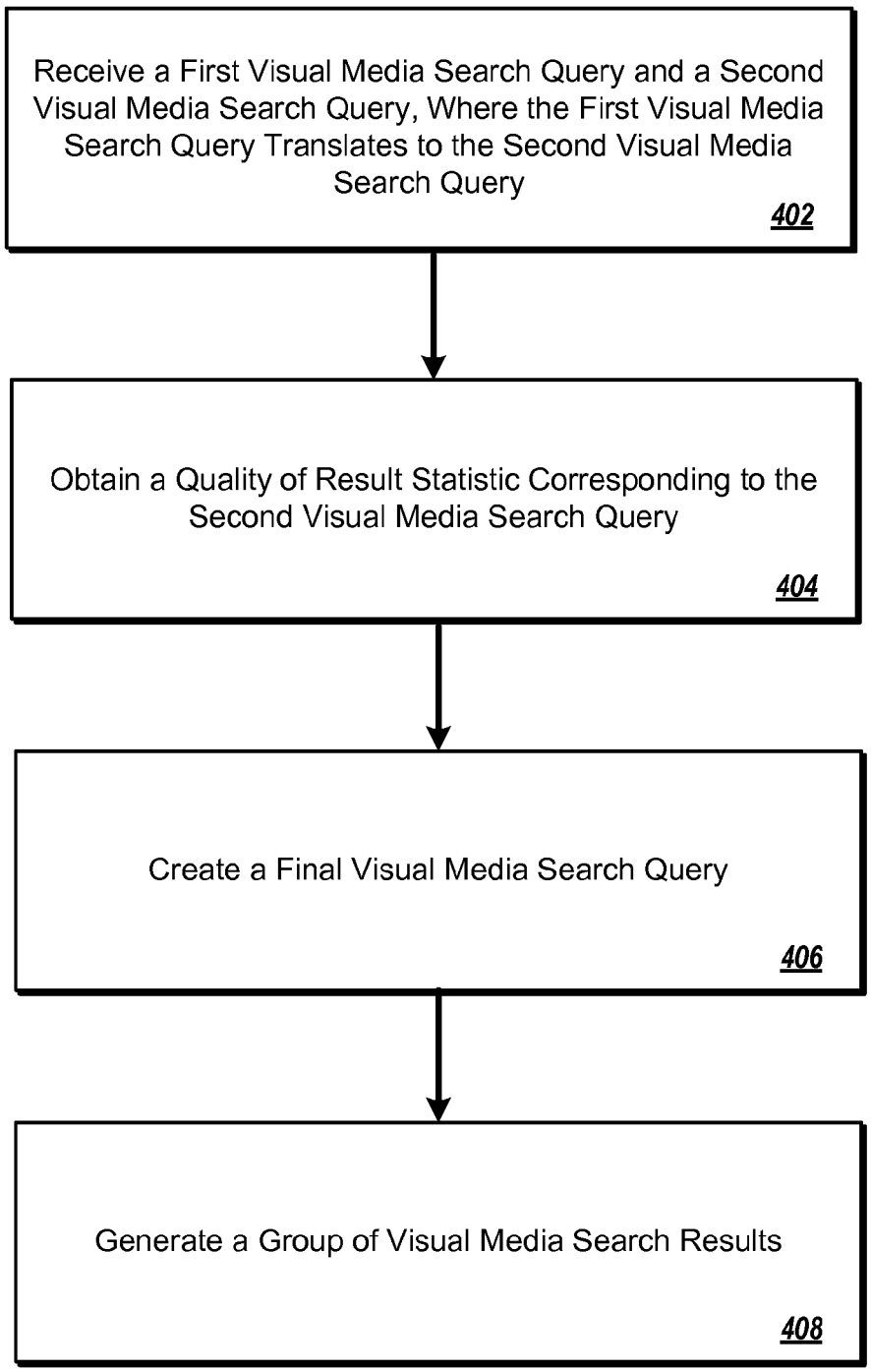
FIG. 4 illustrates an example technique for generating a group of visual media search results using a search query, its translation, and a quality of results statistic for the translation.

FIG. 4 illustrates an example technique 400 for generating a group of visual media search results using a search query, its translation, and a quality of results statistic for the translation. This technique can be performed by, for example, a search engine provider using one or more computers.

In step 402, a first visual media search query and a second visual media search query are received (e.g., by a search engine provider), where the first visual media search query is a translation of the second visual media search query. A visual media search query is a word or words defining a search for visual media. Various methods of receiving a search query are possible. For example, in various implementations, the first visual media search query is received from a user's computer through a web interface. The web interface can be, for example, a webpage, run by a search engine provider, that receives search queries from a user and presents results and other information relevant to the search query to the user. In alternative implementations, the visual media search query is received from a process running on a computer of the search engine or a computer of a third party. Various methods of receiving a second visual media search query that is a translation of the first visual media search query are possible. For example, in various implementations, the translation is received from a process running on a computer of the search engine or a computer of a third party. In alternative implementations, the translation is received from a user's computer through a web interface.

In step 404, a quality of results statistic is obtained for the second visual media search query. The quality of results statistic is an estimate of the expected relevance of results responsive to the second visual media search query. An example technique for obtaining a quality of results statistic is discussed above in regard to FIG. 2.

In various implementations, the quality of results statistic for the visual media search query is the click through rate of the search query: the number of times users selected a search result after submitting a query similar to the translated query, divided by the total number of times a query similar to the translated query was submitted by the population of users. The click through rate can be limited to a click through rate for a particular population of users, for example, users who submit queries from a location where the language of the translated query is frequently used. Using a language can include, for example, speaking the language or submitting queries in the language. A location of a user submitting a search query can be determined, for example, by examining country specific domains or user-specified preferences. A country specific domain is specified by characters at the end of a web address used by the user to access the search system. For example, a web address ending in ".uk" corresponds to a United Kingdom specific domain. A web address ending in ".bg" corresponds to a Bulgarian specific domain. A web address is a string of characters used to identify a web page. User-specified preferences are, for example, a setting specified by a user which identifies the user's country. For example, a user searching from Spain might specify his country as Spain. Additional techniques for determining the location of a user can also be used, for example, examining the IP address corresponding to a computer from which the user submitted the query. An IP address is a logical address identifying a computer on a network. The IP address can be used to determine the user's location by, for example, looking the IP address up in a database that associates IP addresses with a service provider and identifying the location of the service provider. Other geolocation techniques using IP addresses are possible. The click through rate can also be limited to a particular time period, for example, the click through rate for queries received over the last six months, or the click through rate for queries received from Jan. 1, 2005 to Mar. 23, 2007.

In some implementations, the quality of results statistic is further based on an estimate of the dwell time associated with one or more search results selected by users after submitting a query similar to the translated query. In some implementations, the quality of results statistic is further refined by, for example considering the popularity of the translated query, where the popularity of the translated query is the percentage of queries in the search histories that are sufficiently similar to the translated query. In some implementations, the quality of results statistic is further refined by considering an overall estimate of the quality of search results for the translated query based on the content of each result responsive to a given query and its surrounding text.

In some implementations, the quality of results statistic is calculated by examining user search history information. User search history information can be stored, for example, as a user search history. In some implementations, user search histories are generated by the user's computer. In some implementations, user search histories are generated by a search engine provider that receives one or more search queries from a user. In some implementations, user search histories are generated by a third party that aggregates user search information to generate user search histories. Other possible structures for storing user search history are possible, including, for example, storing individual pieces of user search history information.

In some implementations, the user search history information is stored, for example on one or more machine readable storage devices. The user search history information does not have to be in a contiguous section on a machine readable storage device, nor does the user search history information have to be completely stored on the same machine readable storage device.

In some implementations, the quality of results statistic is calculated in real-time as queries are received from users and users select results. In these implementations, queries received from a user, and results selected by the user, are monitored and a quality of results statistic is calculated immediately. In some implementations, calculating the quality of results statistic immediately includes starting with an initial quality of results statistic and updating it as user queries and selections are received.

In some implementations, the quality of results statistics are pre-calculated and stored for later use, for example, in a relational database that associates a given query with its quality of results statistic. In these implementations, a quality of results statistic is obtained by retrieving the stored quality of results statistic corresponding to a given query. In some implementations, the quality of results statistics are calculated as they are needed to estimate the relevance of the translated query. In some implementations, the quality of results statistics calculated as they are needed are stored for later use much as the quality of results statistics calculated in advance are stored for later use.

In some implementations, the quality of results statistics are provided by a third party and the quality of results statistic corresponding to a given query is the quality of results statistic provided by the third party.

In implementations where quality of results statistics are stored for later use, the quality of results statistics are stored, for example on one or more machine readable storage devices. The quality of results statistics do not have to be in a contiguous section on a machine readable storage device, nor do the quality of results statistics have to be completely stored on the same machine readable storage device. In some implementations, the quality of results statistics are stored in a relational database that associates a given query with its quality of results statistic.

In step 406, a final visual media search query is created (e.g., by a search engine provider). In various implementations the final visual media search query is based on the first visual media search query, the second visual media search query, and the quality of results statistic.

In step 408, a group of one or more visual media search results is generated (e.g. by a search engine provider). In various implementations, generating a group of visual media search results includes running one or more search queries over one or more corpora of documents as discussed above in regard to FIG. 3. In some implementations a search is performed for the terms in the final visual media search query, the scores of the search results are adjusted using the quality of results statistic, and the search results are ranked based on their scores. Other methods of generating a group of visual media search results are possible.

Figure 5:
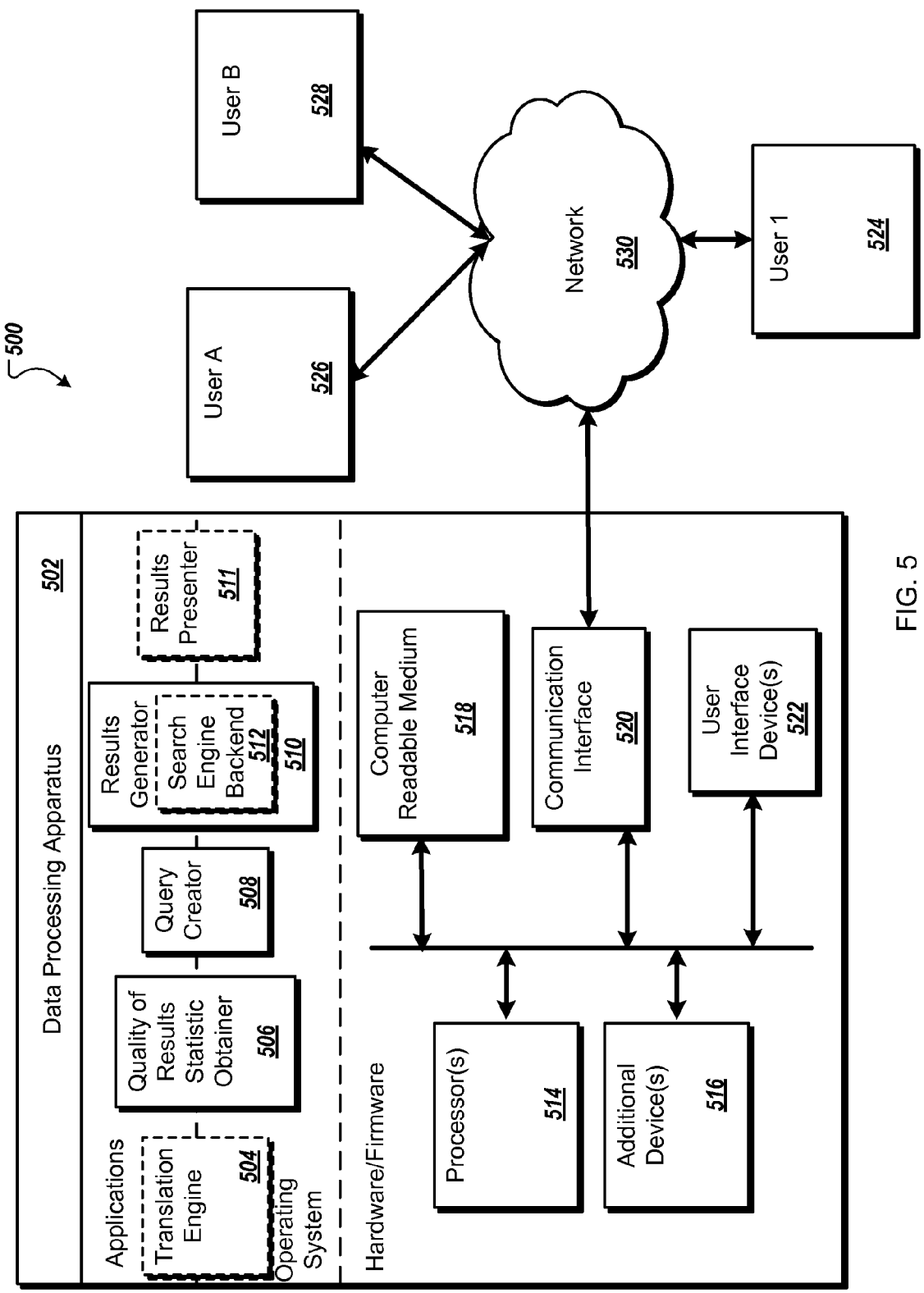
FIG. 5 illustrates an example architecture of a system.

FIG. 5 illustrates an example architecture of a system 500. The system generally consists of a server 502, one or more client computers 526 and 528 that send search queries and information regarding search results selected by the user to the server 502, and a client computer 524 used to submit a visual media search query to the server 502 and to receive visual media search results from the server 502. The computers are connected through a network 530.

While client computers 524, 526, and 528 are shown as separate computers, in some implementations they are the same computer. For example, a computer can be used to send search queries that are used to estimate the relevance of a translated query and also be used to submit a visual media search query that will be combined with its translation and used to generate a group of visual media search results.

The server 502 is a data processing apparatus. While only one data processing apparatus is shown in FIG. 5, a plurality of data processing apparatus may be used.

In various implementations, the server 502 runs a number of processes, e.g. executable software programs. In various implementations, these processes include a translation engine 504, a quality of results statistic obtainer process 506, a query creator process 508, and a results generator process 510 with an optional search engine backend 512. In some implementations the results generator process 510 and the search engine backend 512 are separate processes. Running a process includes, for example, calling a copy of the process, providing system resources to the process, and communicating with the process through a hardware or software interface. A hardware or software interface is an interface that allows processes to communicate with each other or with system hardware, for example, a system bus or commands specified in an application programming interface. In some implementations, a copy of a process is called by instantiating a copy of the process. In some implementations, a copy of a process is called by referencing an already running copy of the process.

The translation engine 504 generates a translation of a given visual media search query. In various implementations, the translation engine generates a translation of a visual media search query by looking up the query in a translation dictionary. Other methods of translation are possible. The translation engine 504 is optional. In some implementations, a translation of a given visual media search query is received from other sources, for example, a user or another process or computer.

The quality of results statistic obtainer process 506 obtains a quality of results statistic corresponding to a given translation of a visual media search query. In some implementations, the quality of results statistic obtainer process 506 obtains a quality of results statistic by calculating the click through rate of the translation. Other methods of obtaining a quality of results statistic that measures the frequency with which users select a search result after submitting a query similar to the translation are possible, for example, using a dwell time associated with one or more results selected by users after submitting a query sufficiently similar to the translated query. Additional techniques for calculating quality of results statistics are possible, for example, considering the popularity of the translated query or considering an overall estimate of the quality of search results for the translated query based on the content of each result responsive to a given query and its surrounding text. In some implementations, the quality of result statistic for the translation of the visual media search query is provided by another process or by another computer, for example through the network 528 or a hardware or software interface. In these implementations, the quality of results statistic is the rate provided by the other process.

In some implementations, the quality of results statistic for the translation of the visual media search query is determined in advance and stored, for example, on the computer readable medium 516 of the server 502 or an external device 514 of the server 502, for example, a hard drive.

The query creator process 508 generates a query using the visual media search query, its translation, and the quality of results statistic for the translation. In some implementations, the query is generated using additional information calculated from the quality of results statistic, in addition to or instead of the quality of results statistic itself.

The results generator process 508 generates a group of search results responsive to the query generated by the query creator process 508. In various implementations, the results generator process sends the query created by the query creator process 508 to a search engine backend 510. The search engine backend runs a search for the terms in the query and returns a group of search results. In some implementations, the search engine backend returns a group of search results and their scores. In some implementations, the results generator process adjusts the scores to reflect the quality of results statistic—for example, raising the scores corresponding to the translation when the quality of results statistic is high and lowering the scores corresponding to the translation when the quality of results statistic is low. In some implementations, the search engine backend ranks the results based on the quality of results statistic before they are returned to the results generator.

The search engine backend process 510 performs a search corresponding to a query over one or more corpora of documents and returns a group of search results. In some implementations, the search engine backend process 510 returns both search results and scores corresponding to those search results. In some implementations, the search engine backend ranks the search results based in part on the quality of results statistic for the translation by, for example, adjusting the scores of the search results responsive to the translated query based on the quality of results statistic, and ranking the search results based on their corresponding scores. In various implementations, the search engine backend 510 is run on the server 502. In these implementations, the search engine backend 510 and the results generator process 508 communicate, for example, through a hardware or software interface. In some implementations, the search engine backend 510 and the results generator 508 are part of the same process. In some implementations, the search engine backend is run on another computer and queries and search results are sent, for example, over a network.

In some implementations, the server 502 also runs a results presenter process 511 that presents search results. In some implementations, the results presenter process 511 is part of the results generator process. Presenting search results can include, for example, displaying search results on a display device, transmitting search results to a user's computer 522 for presentation to the user, transmitting search results to another device, transmitting sounds corresponding to the search results, providing haptic feedback corresponding to the search results, or transmitting signals comprising haptic feedback corresponding to the search results to a user's computer 524 for presentation to the user. Other methods of presenting search results are possible.

In some implementations, the server 502 stores one or more quality of results statistics corresponding to a translation of one or more visual media search queries. In some implementations, the quality of results statistics are stored on a computer readable medium 516. In some implementations, the quality of results statistics are stored on one or more additional devices 514, for example, a hard drive. In some implementations, a representation of the quality of results statistic is stored instead of or in addition to the quality of results statistic itself. In some implementations, a database is stored. The database associates a given translation of a query with its corresponding quality of result statistic, allowing the server to quickly access a quality of result statistic associated with a query in the database.

In some implementations, the server 502 stores user search history information as one or more user search histories or in another form. In some implementations, the user search history information is stored on a computer readable medium 518. In some implementations, the user search history information is stored on one or more additional devices 516, for example, a hard drive. In some implementations, a representation of the user search history information is stored instead of or in addition to the user search history information itself.

The server 502 also has hardware or firmware devices including one or more processors 512, one or more additional devices 514, computer readable medium 516, and one or more user interface devices 520. User interface devices 520 include, for example, a display, a camera, a speaker, a microphone, or a haptic feedback device.

The server 502 uses its communication interface 518 to communicate with a plurality of client computers 524, 526, and 528 through a network 530.

A plurality of client computers 526 and 528 are connected to the server 502 through the network 530. These client computers 526 and 528 are data processing apparatus. Users use these client computers 526 and 528 to submit search queries through the network 530 to the server 502, for example, through a web-browser run on the client computer, for example, Firefox™, available from the Mozilla Project in Mountain View, Calif. The submitted search queries can be any type of search query, including visual media search queries and document search queries. Users submit queries to the server 502 during a session. In some implementations, users receive search results from the server 502 on their respective computers 526 and 528. In these implementations, when a user uses their computer to select a search result to view, information regarding the user selection is sent to the server 502 from the user's computer 526 or 528 through the network 530. In some implementations the information regarding the user selection also includes how long the user viewed the selection.

In various implementations, a user search history corresponding to information sent from the user's computer is created. The user search history stores the sequence of queries submitted by the user and which results were selected after a search was submitted. The user search history may also include additional information such as how long each selected result was viewed. In some implementations, the user search history is stored on the client computer 526 or 528 (whichever one was used to submit the queries), for example on a computer readable medium or an external device such as a hard drive. In these implementations, the quality of results statistic obtainer process 506 can access the user search histories through the network 530 to obtain a quality of results statistic for a translated query. In alternative implementations, the user search history is stored on the server 502 while or after search queries are received from a user. The information stored in the user search history does not have to be stored as a user search history, but can be stored in any manner. In some implementations, the user search history information is stored in a form other than a user search history.

User 1 runs a client computer 524 that is a data processing apparatus. User 1 uses their computer 524 to submit a visual media search query through the network 530 to the server 502, for example, through a web-browser. User 1 also uses their computer to view search results responsive to the visual media search query he or she submitted. These search results are transmitted by the server 502 to the user's computer 524 through the network 530. The user's computer may present the search results to the user, for example, by displaying the results on a display device, transmitting sound corresponding to the results, or providing haptic feedback corresponding to the results.

While the system 500 of FIG. 5 envisions a user who submits a visual media search query through their computer, the visual media search query does not have to be received from a user or a user's computer, but can be received from any data processing apparatus, process, or person, for example a computer or a process run on a computer, with or without direct user input. Similarly, the results do not have to be presented to the user's computer but can be presented to the data processing apparatus, process, or person that sent the visual media search query to the server or a different data processing apparatus, process, or person. While the system 500 of FIG. 5 envisions receiving a series of search queries and results selections from a plurality of users user A 526 and user B 528, the search queries and results selections do not have to be received directly from a population of users but can be received, for example, from another computer that aggregates user search history information. In some implementations, no user search history information is received by the server 502. In these implementations, the server receives quality of results statistics corresponding to given queries from one or more data processing apparatus, for example, through the network 530.

Figure 6:
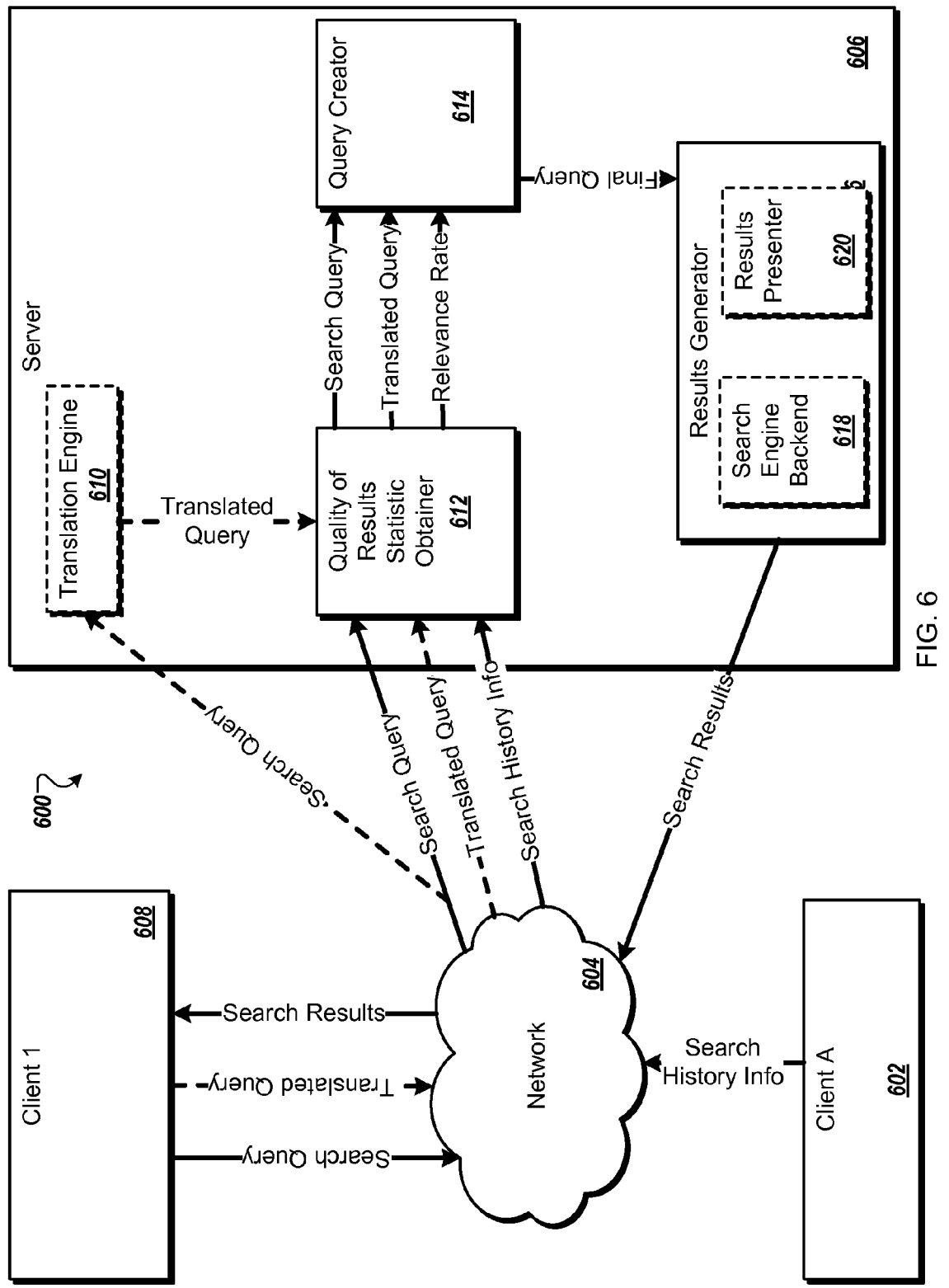
FIG. 6 illustrates example information flow through a system.

FIG. 6 illustrates example information flow through a system.

As shown in FIG. 6, a client computer, client A 602, sends search history information through the network 604 to the server 606. Search history information can include user search histories or separate information regarding which search results were selected by a user or how long a user viewed a selected search result. While only one client computer is shown sending search history information in FIG. 6, a plurality of computers corresponding to a population of users may be used. In some implementations, the search history information is received from a computer other than the computer that the user used to submit the search history information. For example, the search history information can be received from a third party computer that aggregates user search histories.

In various implementations, the server 606 stores the search history information, for example, on a computer readable medium of the server. In some implementations, the search history information is stored on the client computer 602. In these implementations, the server 606 requests the information from the client computer 602 when it is needed. In some implementations, the search history information is accessed when needed to calculate a quality of results statistic. In some implementations, the server 606 or its quality of results statistic obtainer process 612 periodically process the stored search history information and generates a quality of results statistic corresponding to one or more queries. In some implementations, the server 606 or its quality of results statistic obtainer process 612 process search history information in real-time as it is received.

In some implementations, the quality of results statistic is stored, for example, on a computer readable medium of the server. For example, the quality of results statistic can be stored in a relational database that associates a given query with its quality of results statistic. In some implementations, the quality of results statistic is calculated by another computer or process and provided to the server 606, for example through the network 604 or a hardware or software interface.

In some implementations, no search history information is sent to the server 606. Instead, the server receives information associating one or more queries with one or more quality of results statistics from, for example, a computer connected to the server 606 through the network 604.

In various implementations, user 1 uses their computer 610 to send a visual media search query through the network 604 to the server 606. In alternative implementations, the visual media search query is received from a process running on a computer. In some implementations, the process is running on the server 606 and the visual media search query is received, for example, through a hardware or software interface. In alternative implementations, the process is running on another computer and the visual media search query is received, for example, through the network 604.

In various implementations, the server 606 sends a translation of the search query to the quality of results statistic obtainer 612. In some implementations, the translation of the search query is provided through the network 605 by the client computer 608 of the user who submitted the search query. In some implementations, the translation of the search query is provided by a process running on another computer. In some implementations, the translation of the search query is provided by a translation engine 610 run on the server 606.

The quality of results statistic obtainer obtains a quality of results statistic corresponding to the translation of the search query. In some implementations, the quality of results statistic corresponding to the translation has been determined in advance, either by the server 606 or by another computer. In these implementations, the quality of results statistic obtainer 612 selects the pre-determined quality of results statistic corresponding to the translation. In some implementations, the quality of results statistic corresponding to the translation has not already been determined. In these implementations, the quality of results statistic obtainer 612 determines a quality of results statistic using, for example, the search history information from users to calculate a click through rate for the translated query. In some implementations, once the quality of results statistic is determined it is stored, for example, on a computer readable medium of the server. For example, the quality of results statistic can be stored in a relational database that associates a given query with its quality of results statistic.

In various implementations, the search query, translated query, and quality of results statistic are sent to a query creator process 614 on the server 606. In some implementations, the query creator process 614 creates a final query corresponding to the search query, the translated query, and the quality of results statistic for the translated query. In some implementations, the query creator process 614 determines information about the quality of results statistic for the translated query. In some implementations, this additional information is used instead of the quality of results statistic to rank the search results. In some implementations, this information is used in addition to the quality of results statistic to rank the search results.

In some implementations the additional information is determined in advance and stored, for example, on a computer readable medium of the server. For example, the quality of results statistic can be stored in a relational database that associates a given query with the information determined from its quality of results statistic or a relational database that associates a given quality of results statistic with its additional information.

In various implementations, the final query is passed to a results generator process 616 running on the server 606. In various implementations, the results generator process 616 provides the final search query to a search engine backend 618. The search engine backend runs a search for terms in the query and returns a group of search results and their scores. In these implementations, the results generator process 616 adjusts the scores to reflect the quality of results statistic—for example, raising the scores corresponding to the translation when the quality of results statistic is high and lowering the scores corresponding to the translation when the quality of results statistic is low. In some implementations, the search engine backend 618 ranks the results based on the quality of results statistic before they are returned to the results generator 616. Other techniques for generating search results are possible.

In various implementations, once the results generator 616 has generated a group of visual media search results, the server 606 presents the search results by sending them through the network 604 to the device that submitted the search 608. In some implementations the server 606 can present the results in other ways, including, for example, sending the results to the process that sent the visual media search query, sending the search results to another data processing apparatus or process, displaying search results on a display device, transmitting sounds, or providing haptic feedback. In some implementations, the search results are presented by a results presenter 620 run on the server 606. In some implementations, the results presenter 620 is part of the results generator 616.

Figure 7:
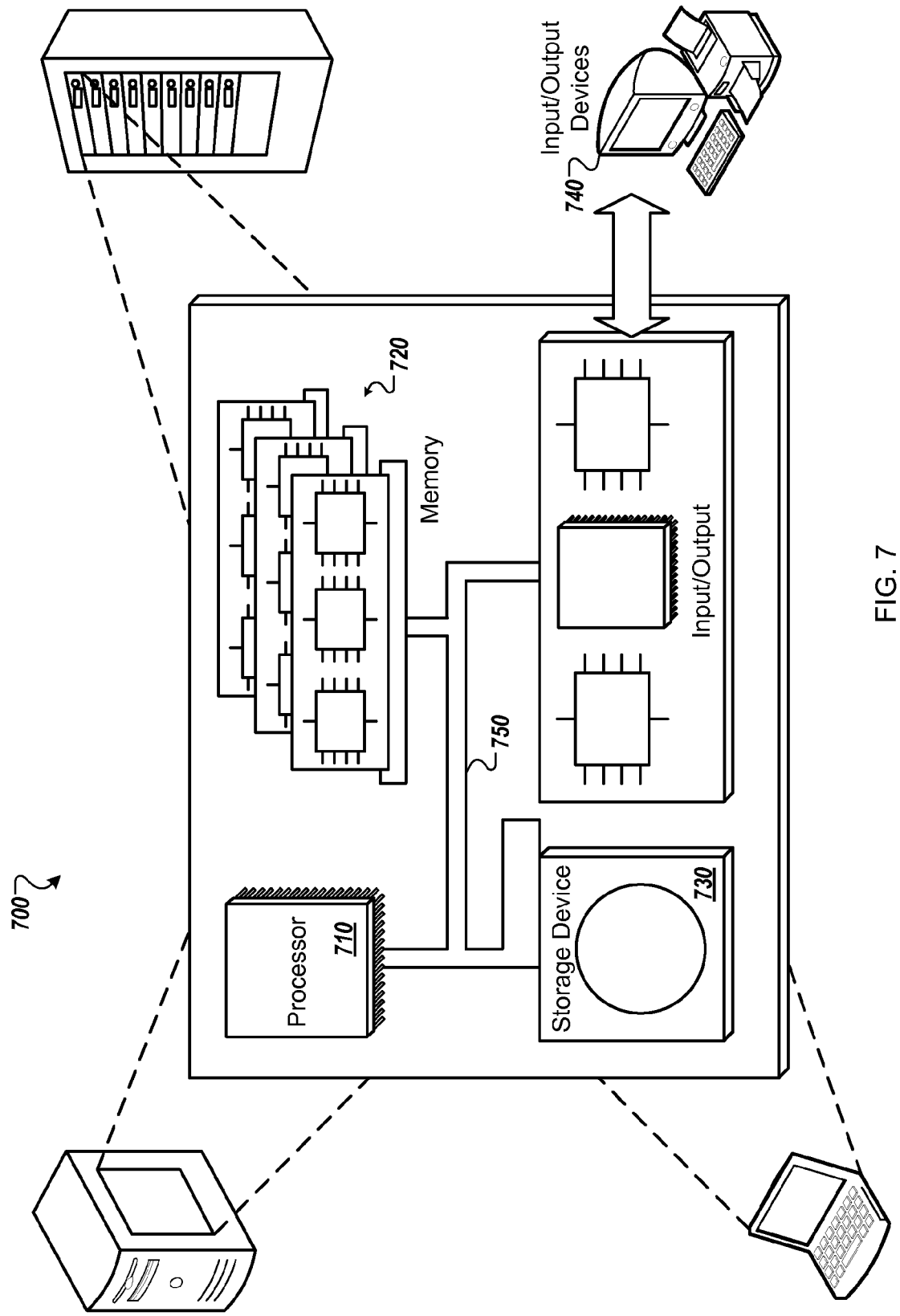
FIG. 7 is a schematic diagram of a generic computer system.

FIG. 7 is a schematic diagram of an example of a generic computer system 700. The system 700 can be used for the operations described in association with the method 400 according to one implementation. For example, the system 700 may be included in either or all of the client computer of user A, 524, the client computer of user B, 526, the client computer of user 1, 522, and the server 502.

The system 700 includes a processor 710, a memory 720, a storage device 730, and an input/output device 740. Each of the components 710, 720, 730, and 740 are interconnected using a system bus 750. Instructions that implement operations associated with the methods described above can be stored in the memory 720 or on the storage device 730. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700, including program instructions. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The storage device can store extractors, pattern matching engines, gadgets, machines, and programs.

The input/output device 740 provides input/output operations for the system 700. In one implementation, the input/output device 740 includes a keyboard and/or pointing device. In another implementation, the input/output device 740 includes a display unit for displaying graphical user interfaces.

The features described above can be implemented in digital electronic circuitry, integrated circuitry, specially designed ASICs (application specific integrated circuits), computer hardware, firmware, software, and/or combinations thereof. Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used in this specification, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data, including databases, include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, client computer of user 1, 524 and the server, 502, may be implemented within the same computer system.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method, comprising:
   receiving a first visual media search query in a first language and a second visual media search query in a different second language, where the second visual media search query is determined to be a translation of the first visual media search query into the second language;
   obtaining a quality of results statistic for the second visual media search query, wherein the quality of results statistic is an estimate of expected relevance of results responsive to the second visual media search query in the second language;
   creating a final visual media search query comprising the first visual media search query in the first language, the second visual media search query in the different second language, and information corresponding to the quality of results statistic for the second visual media search query; and
   sending the final visual media search query to a search engine; and
   receiving a final group of visual media search results responsive to the final visual media search query from the search engine, wherein the final group of visual media search results comprises visual media search results satisfying a part of the final visual media search query corresponding to the first visual media search query in the first language and visual media search results satisfying a part of the final visual media search query corresponding to the second visual media search query in the second language,
   wherein each of the visual media search results in the final group is assigned a score based in part on the quality of results statistic for the second visual media search query in the second language,
   wherein each of the visual media search results in the final group is assigned with one of a plurality of confidence bins based on the quality of results statistic and wherein the visual media search results satisfying the part of the final visual media search query corresponding to the second visual media search query are assigned a score based in part on the confidence bin.

2. The method of claim 1, wherein the quality of results statistic is a click through rate for queries similar to the second query.

3. The method of claim 2, wherein the quality of results statistic is a click through rate for the second query.

4. The method of claim 1, wherein the quality of results statistic reflects a dwell time for search results selected by users after submitting a query similar to the second visual media search query.

5. The method of claim 1, further comprising:
   presenting the final group of one or more visual media search results.

6. The method of claim 1, wherein visual media is an image, a video, an image embedded in a file, or a video embedded in file.

7. A computer program product stored on a non-transitory computer readable medium which, when executed by data processing apparatus, causes the data processing apparatus to perform operations comprising:
   receiving a first visual media search query in a first language and a second visual media search query in a different second language, where the second visual media search query is determined to be a translation of the first visual media search query into the second language;
   obtaining a quality of results statistic for the second visual media search query, wherein the quality of results statistic is an estimate of expected relevance of results responsive to the second visual media search query in the second language;
   creating a final visual media search query comprising the first visual media search query in the first language, the second visual media search query in the different second language, and information corresponding to the quality of results statistic for the second visual media search query; and
   sending the final visual media search query to a search engine; and
   receiving a final group of visual media search results responsive to the final visual media search query from the search engine, wherein the final group of visual media search results comprises visual media search results satisfying a part of the final visual media search query corresponding to the first visual media search query in the first language and visual media search results satisfying a part of the final visual media search query corresponding to the second visual media search query in the second language,
   wherein each of the visual media search results in the final group is assigned a score based in part on the quality of results statistic for the second visual media search query in the second language,
   wherein each of the visual media search results in the final group is assigned with one of a plurality of confidence bins based on the quality of results statistic and wherein the visual media search results satisfying the part of the final visual media search query corresponding to the second visual media search query are assigned a score based in part on the confidence bin.

8. The computer program product of claim 7, wherein the quality of results statistic is a click through rate for queries similar to the second visual media search query.

9. The computer program product of claim 8, wherein the quality of results statistic is a click through rate for the second visual media search query.

10. The computer program product of claim 7, wherein the quality of results statistic further reflects a dwell time for search results selected by users after submitting a query similar to the second visual media search query.

11. The computer program product of claim 7, further comprising:
presenting the final group of one or more visual media search results.

12. The computer program product of claim 7, wherein visual media is an image, a video, an image embedded in a file, or a video embedded in file.

13. A system comprising data processing apparatus programmed to perform operations comprising:
receiving a first visual media search query in a first language and a second visual media search query in a different second language, where the second visual media search query is determined to be a translation of the first visual media search query into the second language;
obtaining a quality of results statistic for the second visual media search query, wherein the quality of results statistic is an estimate of expected relevance of results responsive to the second visual media search query in the second language;
creating a final visual media search query comprising the first visual media search query in the first language, the second visual media search query in the different second language, and information corresponding to the quality of results statistic for the second visual media search query; and
sending the final visual media search query to a search engine; and
receiving a final group of visual media search results responsive to the final visual media search query from the search engine, wherein the final group of visual media search results comprises visual media search results satisfying a part of the final visual media search query corresponding to the first visual media search query in the first language and visual media search results satisfying a part of the final visual media search query corresponding to the second visual media search query in the second language,
wherein each of the visual media search results in the final group is assigned a score based in part on the quality of results statistic for the second visual media search query in the second language,
wherein each of the visual media search results in the final group is assigned with one of a plurality of confidence bins based on the quality of results statistic and wherein the visual media search results satisfying the part of the final visual media search query corresponding to the second visual media search query are assigned a score based in part on the confidence bin.

14. The system of claim 13, wherein the quality of results statistic is a click through rate for queries similar to the second visual media search query.

15. The system of claim 14, wherein the quality of results statistic is a click through rate for the second visual media search query.

16. The system of claim 13, wherein the quality of results statistic reflects a dwell time for search results selected by users after submitting a query similar to the second visual media search query.

17. The system of claim 13, further operable to perform operations comprising:
presenting the final group of search results.

18. The system of claim 13, wherein visual media is an image, a video, an image embedded in a file, or a video embedded in file.

* * * * *

UNITED STATES PATENT AND TRADEMARK OFFICE
CERTIFICATE OF CORRECTION

| | | |
|---|---|---|
| PATENT NO. | : 8,572,109 B1 | Page 1 of 1 |
| APPLICATION NO. | : 12/481421 | |
| DATED | : October 29, 2013 | |
| INVENTOR(S) | : Hodge et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 326 days.

Signed and Sealed this
Seventh Day of April, 2015

Michelle K. Lee
*Director of the United States Patent and Trademark Office*